March 16, 1943. M. C. TEAGUE ET AL Re. 22,290
METHOD OF MAKING PERFORATED LATEX RUBBER FILMS
WITH OR WITHOUT TEXTILE FABRIC BACKINGS
Original Filed Dec. 10, 1940
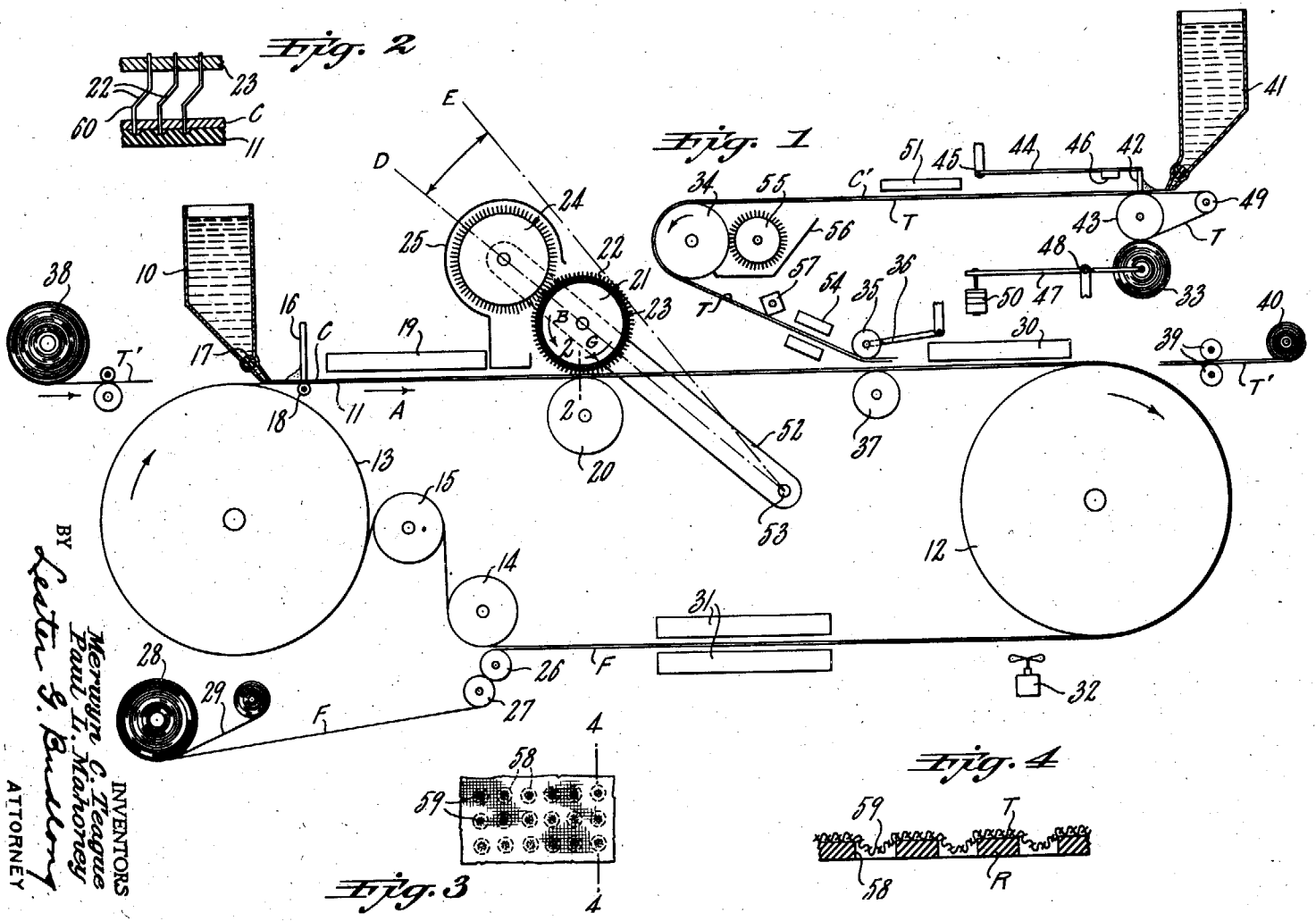
INVENTORS
Meruyn C. Teague
Paul I. Mahoney
BY Lester G. Budlong
ATTORNEY Reissued Mar. 16, 1943 Re. 22,290

UNITED STATES PATENT OFFICE 22,290

METHOD OF MAKING PERFORATE LATEX RUBBER FILMS WITH OR WITHOUT TEXTILE FABRIC BACKINGS

Merwyn C. Teague, Ridgewood, N. J., and Paul L. Mahoney, Jackson Heights, N. Y., assignors to United States Rubber Company, New York, N. Y., a corporation of New Jersey Original No. 2,289,151, dated July 7, 1942, Serial No. 369,476, December 10, 1940. Application for reissue January 27, 1943, Serial No. 473,740

15 Claims. (Cl. 18—57)

This invention relates to an improved method of making a perforate, elastic film of latex rubber. The method includes the manufacture of such films either separately or combined with textile fabrics, and this application is a continuation-in-part of application Serial No. 209,188, filed May 21, 1938.

The term "latex" in the description and claims is used to designate broadly coagulable aqueous dispersions of elastic materials, including artificial dispersions of rubber or rubber-like materials as well as natural latex, which may be preserved, compounded, thickened and/or otherwise treated as desired, as by vulcanization, and which may be in a normal, diluted, concentrated or purified condition produced by methods well known in the art.

The term "latex rubber" is used herein to designate solids deposited in situ from "latex" either by drying or chemical coagulation.

When a coating of latex is applied to a deposition backing and the solids therein are deposited from the coating on to the backing, as by drying or chemically coagulating the coating, the film so formed by the deposit is coherent and elastic. Due to the tough elastic properties of such a film when dried it is not practicable to perforate it with an instrument so that the perforations will remain open in the relaxed film after the instrument is removed therefrom, unless portions of the film have been removed or softened by heat and permanently deformed by the perforating instrument, which may be used in a punching out or closed molding operation. Both of these operations have some disadvantages.

In the punching out operation some of the material is lost and the molding operation, when carried out in a closed mold, cannot be employed to make latex films of extended lengths.

Furthermore, when such former methods are applied to perforating latex films on a textile fabric deposition backing, they have the further disadvantage of injuring the fabric. In the punching out operation the fabric is injured as a result of the threads being cut by the punches, which may also occur in the molding operation when considerable pressure is applied to the fabric by the molding pins. The pressure also forces the latex through the fabric and forms rubber deposits on the outer surface of the fabric, which is undesirable, and where relatively high temperatures are used on a wet film in a closed mold the fabric may be stained.

There is still a further disadvantage of molding a wet latex film in a closed mold. The moisture in the film under pressure cannot readily escape and it causes pits or blisters to be formed in the film.

The above difficulties are avoided by the practice of the present invention, in which a coating of substantially uncoagulated latex is applied to a deposition backing and perforated thereon by extending the ends of pins into or through the coating and removing the pins therefrom before it has been substantially coagulated. The latex is reduced to such a viscous condition before the pins are removed that the openings formed by the pins do not close up as a result of forces of gravity and surface tension acting thereon. The term "substantially uncoagulated" as used herein includes that degree of coagulation where the latex retains its plastic and substantially non-elastic condition and excludes that degree of coagulation where the latex has become tough and elastic to the extent of a wet freshly coagulated film. As is well known, latex retains its plastic and non-elastic condition so long as the latex particles are somewhat dispersed, and it loses such condition in proportion to the degree of coagulation. The term "plastic and substantially non-elastic condition" is used relatively in the foregoing sense.

The pins may be extended through or into the coating and are removed therefrom while the viscosity of the coating at usual working temperatures is at least high enough to substantially maintain the shape of the depressions formed in the coating when subjected to no other flow producing influences than the ordinary forces acting thereon, such as forces of gravity, surface tension and other internal stresses. The latex may be applied to the deposition backing while it is in such a viscous condition or the latex may be converted into such condition after having been applied and before or after the pins have been inserted in the latex coating. The coating is rendered coherent and elastic by drying the coating or chemically coagulating it after the removal of the pins.

In the practice of this invention the latex may be applied to the deposition backing by spraying it, or spreading it, with a doctor blade, or a grooved roll, or bar, or the like, on to the backing in accordance with the usual known methods. The deposition backing is preferably made of yieldable material, such as textile fabric which may be permanently combined with the perforate rubber film to produce a porous laminated textile and latex rubber fabric, or the backing may be temporary and may be made of material, such as soft rubber, either solid or sponge, from which the perforate latex rubber film may be removed after the film has been coagulated and rendered coherent and elastic. The latex coating may be applied directly to the temporary backing and the textile fabric subsequently combined with the coating and then removed with the textile fabric from the temporary backing. In order to facilitate the removal of the film the deposition backing may be treated to prevent the film from adhering too tenaciously to it. For example, if the backing is made of rubber, its deposition surface may be halogenated to reduce the adhesion. It is also contemplated that the backing may be made of hard material such as hard rubber or glass, provided the ends of the pins are tipped with soft resilient rubber or the like.

If it is desired to reduce the size of the perforations or depressions and the spacing therebetween after they are made in the coating, and also to super-relax the textile fabric that may be combined with the film, the temporary or removable deposition backing is made of elastic material. In the event the latex coating is applied directly to the elastic backing the pins are extended into and withdrawn from the coating while the backing is retained in a stretched condition. The tension on the elastic backing is then released and the size of and the distance between the depressions or holes in the coating are reduced by the contraction of the elastic backing. If it is desired to combine a textile fabric having a knitted or open weave with the pin impressed rubber film, it is adhered to the film prior to the release of the tension on the stretched deposition backing. Before the tension is released the film is dried to a tacky condition, but is not rendered so stiff as to materially resist the contraction of the elastic backing. When the tension is released on the backing the threads of the textile fabric extending in the direction of the contraction of the backing are shortened and/or buckled by the contractive forces of the elastic deposition backing. When the threads of the textile fabric are so retained, the fabric is referred to as being super-relaxed. The coating of latex is then heated to cause it to set in its condensed condition, and to render it sufficiently elastic to elastically retain the textile fabric in the super-relaxed condition without the aid of the deposition backing. The latex rubber film while adhered to the textile fabric may be stripped from the elastic backing and the threads will be retained in the super-relaxed condition. The porosity of the film may be improved by stretching it to break any films of rubber over the openings after it has been stripped off the backing.

It is also contemplated that the latex coating may be applied directly to the textile fabric having a knitted or open woven construction and that the coating be penetrated by the pins while on the fabric, partially dried, and then adhered to the stretched elastic surface, the tension on the surface being subsequently released to contract the coating and thereby reduce the size of the holes or depressions therein, and the space between such holes or depressions. The textile fabric is simultaneously super-relaxed and the laminated fabric is treated as previously described.

One end of each penetrating pin is retained in a support, and the other end projects from the surface of the support. The surface of the pin support may be the periphery of a cylinder which is rotated so that the projecting ends of the pins are extended into the latex coating carried by the deposition surface or backing, which is moved at the same speed as the ends of the pins. When the ends of the pins are extended into the coating, the surface of the pin support is maintained out of contact with the surface of the latex coating, so as not to disturb, or compress the surface of the coating between the pins facing the pin supporting surface and to permit any liquid that may be separated from the coating to be freely dispersed on and evaporated from its surface, and thereby prevent the surface of the coating between the pins from being pitted or otherwise marred by the pin support.

Pins having either blunt or sharp conical ends may be used to perforate the latex coating. When blunt pins are employed openings are formed in the coating without piercing the deposition backing, and a coating of latex is retained between ends of the pins and the backing. Due to this action the pins are withdrawn before the latex coagulates under their ends so that a sufficient quantity of the latex will be withdrawn by the pins to prevent the bottom of the depressions from being closed by coagulated films.

The blunt pins are particularly useful for making relatively large holes in the coating because such holes can be formed without piercing the deposition backing as is required in the case of sharp pins. The blunt pins are particularly desirable where it is desired to make openings in the latex coating larger than the mesh of the textile fabric upon which it is deposited and without forming openings in the fabric, because the ends of the pins do not extend through the fabric and break the threads, whereas if it is attempted to make openings in the coating larger than the stretchable size of the meshes, or loops in the case of a knitted fabric, with the use of sharp pins, the conical ends of the pins are extended through the fabric and form holes therein or enlarge the mesh thereof and are liable to break the threads of the fabric.

However, where it is desired to form openings in the textile fabric and relatively small holes in the coating, the sharp pointed pins may be used to advantage. Furthermore, greater tolerance can be allowed in the variation in the length of the sharp pointed pins in the same set, than in the case of blunt pins.

Considering the above action of the pins on the latex coating, it is desirable to extend the blunt pins into the latex coating and remove them therefrom before the latex has substantially coagulated to prevent coagulated films from forming over the depressions formed by the pins. It is also desirable to extend the sharp pins into the latex coating before the latex has substantially coagulated to prevent or reduce the amount of latex carried by the sharp points into or through the backing, and it is also desirable to remove the points before further coagulation in order to speed up the process. Where the latex is carried through the backing such as the textile fabric with the sharp pins the presence of this latex in some cases is objectionable and it is difficult to remove because it is bonded through the openings to the coating on the opposite side.

Where the latex coating is applied to a continuously moving deposition backing of great length or having the form of a continuous belt, which in either case is moved in cooperative relation with the ends of the pins, the process is continuous which greatly facilitates the manufacture of the material.

The foregoing features and other characteristics of this invention are further described in reference to the accompanying drawing, in which:

Fig. 1 is a diagrammatic side elevational view of an apparatus for carrying out the process embodying this invention in its several forms;

Fig. 2 is an enlarged cross-sectional view taken on line 2—2 of Fig. 1, illustrating the relationship of the penetrating pins and their supporting backing to the latex film and the deposition backing;

Fig. 3 is a plan view of a laminated elastic fabric comprising a textile fabric combined with a perforate lamina of rubber made in accordance with the process of this invention; and Fig. 4 is an enlarged cross section of Fig. 3 on line 4—4.

In the manufacture of perforate latex rubber films in accordance with one form of the invention which may be carried out by the apparatus illustrated in Fig. 1, the latex is supplied from a tank 10 to a deposition backing 11, which comprises a travelling belt carried by two large drums 12 and 13 and lower rolls 14 and 15, which cooperate with the lower reach of the belt 11. The drum 12 preferably has a larger diameter at the center and it tapers to each end to keep the belt 11 smoothed out laterally. The latex is spread by a doctor blade 16 evenly over the deposition backing 11 to form a coating C of latex thereon. The flow of the latex from the tank 10 is controlled by a valve 17, and the backing 11 is supported under the doctor blade 16 by a roll 18 to cause the latex to be spread evenly. In the event the latex is so liquid as applied to the belt 11 that the indentations to be formed in the coating by the pins would fill up due to the flow of the coating that may be caused by the forces of gravity and/or surface tension acting thereon upon the removal of the pins, the coating is first passed under a dryer 19 to increase its viscosity to the extent required to prevent such flow. The coating C is carried by the belt 11 between a roll 20 and a pin carrying roll 21, which has a plurality of closely spaced pins 22 arranged around its periphery on a pin supporting backing 23. The pins 22 may be of the well known card clothing type anchored in a supporting backing of fabric or leather. The ends of the pins 22 are driven in the direction of the arrow B and at the linear speed of the belt 11. Where pins having blunt ends are used, the pressure of pins 22 against the belt supporting roll 20 causes the pins to penetrate the coating to such a depth that the ends of the pins 22 are forced through or nearly through the latex coating C. Any particles of latex that may stick to the ends of the pins 22 are removed therefrom by a driven rotary brush 24 and are caught in a pan 25. Dry heated air may be directed upon the pins after they have been removed from the coating to coagulate any latex particles on the pins to facilitate its removal therefrom by the brush 24. Where blunt pins are used the pins are not heated sufficiently to coagulate the latex at their ends before they are removed from the coating.

The coating C is then carried by the belt 11 around the large drum 12 and before it reaches the bottom roll 14 it is converted into an elastic film F. At this point it is stripped from the belt by the rolls 26 and 27 and is wound on a reel 28. It is usually desirable to wind in a lining cloth 29 between the convolutions of the film to prevent them from adhering to one another.

The dryer 19 controls the viscosity of the latex coating to prevent the holes formed by the pins 22 from closing up after the pins are removed. Care is used not to dry the coating to a tough elastic condition before it is penetrated by the pins 22. After the latex coating is penetrated, it is preferably completely dried to render it elastic before it is removed from the deposition belt 11. This may be effected by means of driers 30 and 31 and/or currents of air which may be supplied by a fan 32. The coating may also be rendered elastic by applying a chemical coagulant thereto, after the openings have been formed therein by the pins.

Where it is desired to combine the perforated coating C with a textile fabric, a web of textile fabric T is led from a reel 33 over a roll 34 and underneath a roller 35 which is journaled in a pivoted arm 36 which may be lowered to press the fabric on to the latex coating C after it has been perforated by the pins 22 and before it has been coagulated to the extent that it will not form a good bond with the fabric T. The belt 11 is supported under the roll 35 by a roll 37. The distances between the adjacent surfaces of these rolls can be so adjusted as to obtain the desired degree of pressure to obtain good adherence without forcing the latex through the fabric and without closing the holes in the coating C. In such operation the fabric T is not coated by the apparatus interposed between the rolls 33 and 34, such apparatus being employed for a purpose as will be hereinafter explained. The laminated textile and latex rubber fabric is carried by belt 11, around the drum 12, and taken from the belt by means of the stripping rolls 26 and 27 and wound up in the manner described in reference to the separate latex rubber film F.

It is also contemplated by this invention that the coating of latex may be applied directly to a textile fabric and permanently combined therewith. In this case, as shown in Fig. 1, the textile fabric T′, at the left of Fig. 1, is led from the roll 38 on to the belt 11, where it is coated with latex supplied from the tank 10 and spread by the spreader 16 and dried if necessary, by the drier 19 and perforated by pins 22 on the card pin roll 21 as previously described in reference to the coating C. The coated fabric T′ is passed through the drier 30 where it is preferably completely dried and then removed from the top reach of the belt 11 before it passes around the roll 12. The laminated textile and latex rubber fabric thus produced is pulled along by the pinch rolls 39 and is then wound on a reel 40. In this operation, where the latex is applied directly to the fabric T′, the belt 11 may be eliminated. In such event the fabric would be drawn over the rolls 18 and 20 by the movement of the latter roll and the pinch rolls 39 which would be driven at the same surface speed.

For the purpose of reducing the size of the perforations formed in the latex coating by the ends of the pins 22 and the distance between such perforations, the belt 11 is made of elastic material to which the coating is applied and is penetrated by the pins 22 while the belt is stretched. The pins are then withdrawn and the tension on the belt is released to permit it to contract and thereby contract the coating and reduce the size of the perforations in the coating and the distance between them. Such result may be accomplished by applying the latex coating to the belt 11 and penetrating the coating in the manner hereinbefore described. The belt 11 being elastic, its top reach is stretched and the tension thereon is released, as the belt passes around the lower quarter of the drum 12, by positively driving drums 12 and 13, and the former at a faster surface speed than the latter. In order to obtain the necessary traction to produce the tension, the surface of the drums may be roughened as by the use of an abrasive coating, and/or retaining some tension on the bottom reach of the belt 11, but always less than that on the top reach, so as to hold the belt in tight engagement with the drums 12 and 13. In this operation, the coating C should be contracted before it is dried to such an extent that it will resist the contraction of the belt 11 to any substantial amount. After being contracted the coating is dried to convert it into an elastic latex film F which is treated and removed from the bottom reach of the belt 11 by the stripping rolls 26 and 27, as previously described.

A porous super-relaxed textile and rubber fabric may be made by combining a textile fabric T with the perforated latex coating C while it is on the stretched top reach of the belt 11 during the operation next above described. This may be done by adhering the textile fabric T to the coating C with the roller 35 while the coating is in a substantially uncoagulated condition. The coating with the fabric T adhered thereto is then treated in the manner next above described. The textile fabric T is super-relaxed upon the contraction of the coating, and the super-relaxed textile and rubber fabric is removed from the belt 11 by the stripping rolls 26 and 27.

The above porous laminated super-relaxed fabric may be produced by applying the coating of latex directly to the textile fabric T and penetrating the coating thereon with the pins 22. In this operation the coating apparatus to the left of the pin roll 21 is not employed. The latex is supplied from a tank 41 and spread upon the fabric T by the doctor blade 42 to produce the coating C′ on the fabric. The fabric T is supported underneath the doctor blade 42 by a roll 43. The blade 42 is carried by an arm 44 pivoted at 45. The space between the end of the doctor blade 42 and the fabric is controlled by an adjustable stop 46. For the purpose of maintaining some tension on the fabric T and the line of contact between it and the roll 43 constant, the roll of fabric 33 is rotatably mounted on an arm 47 pivoted between its ends at 48, and the fabric is passed over a roll 49. A weight 50 on the arm 47 maintains the roll 33 in contact with the roll 43.

The viscosity of the coating may be controlled to the proper degree by the drier 51. In order to penetrate the coating C′ with the pins 22, the arm 52 pivoted at 53 and carrying the card pin roll 21 and brush 24, is moved about the pivot point from the position D to the position E, so that the pins 22 are brought into rolling engagement with the fabric T as it passes around the roll 34. The direction of rotation of the roll 21 is now reversed to that of the arrow G, and the pins are supported out of contact with the belt 11. The latex coating C′ is adjacent to the roll 21 and is penetrated by the ends of the pins 22, which are driven at the same linear speed as the fabric T and the belt 11, and firmly press the fabric against the supporting roll 34.

Since the latex coating C′ has been applied to the fabric T in a substantially uncoagulated condition, good adhesion to the fabric will be obtained if it is now dried to a tacky coagulated condition, and this is preferably done after it has been perforated by the pins 22 and before it is adhered to the stretched reach of the belt 11, in order to control the adhesion of the coating to the belt and to obtain better control of the flow of the coating and reduce the liability of the holes therein being closed during the process of applying the adhesive to the belt. As shown herein the coating is dried to the tacky coagulated condition by the drier 54, and it is then adhered to the stretched reach of the belt 11 by firmly pressing the coating C′ against the belt 11 between the rolls 35 and 37. With the proper control of pressure, the desired adhesion is obtained without closing the holes formed by the pins 22. The laminated textile and latex rubber fabric so produced may be then carried through the process and treated in the manner described in reference to the production of the previously mentioned condensed latex rubber film, and the laminated super-relaxed textile and later rubber fabric.

The roll 34 is covered with solid soft resilient rubber for use with penetrating pins 22 having blunt ends. And when so used some of the latex coating under the blunt ends of the pins is forced through the fabric T. Some of this latex sticks to the surface of the roll 34 and some of it sticks to the outer surface of the fabric T. That which sticks to the roll 34 is removed by a revolving brush 55 and the removed particles are caught in a pan 56. The latex that sticks to the outer surface of the fabric T is coagulated but not thoroughly dried by passing warm air over it after the coating has been perforated, and the coagulated particles are scraped off by the square revolving beater bar 57. The loose rubber particles on the surface of the fabric T are blown laterally from the fabric with an air jet, not shown. In all of the cases mentioned herein the driers may consist of open heaters or of means for circulating warm dry air over the latex coating. It is preferred that the drier 31 be capable of at least partially vulcanizing the rubber film before it is removed from the belt 11 which is done in some cases as a precaution to prevent the rubber from being torn when removed by the rolls 26 and 27.

If the sharp pointed pins are used on the pin roll 21 to penetrate the coating from the outer surface, the points are extended through the coating into the material upon which it is applied and if the latex is applied to the textile fabric the points of the pins are extended into the backing which supports the fabric. In such case sponge rubber may be used to support the latex coating directly or to support the fabric and for this purpose the outer surface of the belt 11 and the roll 34 may be covered with a layer of sponge rubber.

In the event the latex coating is applied to the textile fabric the sharp pins may be extended through the coating from either its outer surface or from the fabric side without supporting the fabric at the point where it is perforated. When the pins are extended through the fabric from the coated side, the fabric is suspended between two rolls and the pin roll is positioned between the two rolls so that the pins will extend through the unsupported fabric from the coated side. The pins may be extended through the coating from the fabric side by running fabric over a pin roll with the fabric next to the roll. In this case the roll having sharp pins in it may be substituted for the roll 34 and the pin roll 21 would not be utilized. It is desirable that the fabric be stretched cross-wise where it is passed over the pin rolls whether the pins are extended through the fabric from the coated or the fabric side. The crosswise stretch may be accomplished with a tentering machine.

The super-relaxed laminated porous elastic fabric produced with the use of blunt pins by the foregoing operations is illustrated in Figs. 3 and 4. The laminated fabric, as shown in cross section in Fig. 4 comprises a lamina of textile fabric T and a lamina of perforate latex rubber R produced by the combination of the textile fabric and the perforate latex coating. The lamina of rubber is provided with a plurality of pores or openings 58 which are produced entirely by the pins 22 or partially by the pins and by stretching the lamina R to break any portion of the latex rubber deposited from the coating not displaced by the pins 22. When the film of latex rubber R is condensed and the textile fabric T is super-relaxed, the portions of the textile fabric opposite the openings 58 are drawn into and partially fill such openings. Small indentations 59 are produced in the surface of the textile fabric T opposite each of the pores which produces a design effect on the textile fabric side of the composite fabric.

If desired a porous laminated super-relaxed fabric may be produced by first super-relaxing a textile fabric and applying the coating of latex thereto as described in the co-pending application of Merwyn C. Teague, Serial No. 221,811, filed July 28, 1938, and then rendering the latex coating porous as described hereinbefore. In carrying out this operation the textile fabric is removably adhered to a stretched elastic surface with a removable adhesive such as starch or glue. The tension on the elastic surface is released to super-relax the fabric and then the coating of latex is applied thereto and perforated with the pins 22 while the coating is in the proper condition as hereinbefore described. The pin impressed coating is then dried at least partially vulcanized, and removed with the textile fabric from the elastic super-relaxing surface as described in said co-pending application. The removal may be effected by softening the removable adhesive with water and then stripping the fabric from the super-relaxing surface. If the removable adhesive has not dried too much the fabric may be stripped from the surface without further softening the adhesive. After the fabric is removed the adhesive used to adhere it to the surface is washed from the fabric and the porous laminated super-relaxed textile and latex fabric is obtained. The textile fabric layer in the textile and rubber fabric so produced does not extend into the perforations in the latex rubber layer to the extent shown in Fig. 4 and in some cases the extension of the fabric into the perforations is not noticeable.

It is intended that the rubber film may be vulcanized either before or after it is removed from the traveling belt and either before or after it is wound on the reels and whether made separately or combined with a textile fabric.

An enlarged view of the pins 22 having blunt ends, taken on section line 2—2, in Fig. 1, is shown on Fig. 2. The pins are extended through the coating C and have made temporary depressions in yieldable deposition backing. 11. As shown all of the coating C has been displaced underneath the pins, but where pins with blunt ends are used it is not necessary to completely displace all of the latex at the ends of the pins. A thin deposit of latex may be left underneath the pins which may be broken by stretching the elastic film of latex rubber made therefrom.

The pins 22 are preferably constructed so that they are capable of resiliently resisting the pressure they exert on the deposition backing. This enables the end of each pin to adjust itself for variations in the length of the pins and thickness of the deposition backing, and to exert a firm pressure on the backing. The resiliency is procured by bending the pins 22 as at 60 or by forming coils in the pins. It is also contemplated that the pins may be arranged in any desired design and cross-sectional shape to produce designs or surface effects on the porous latex film and/or the super-relaxed fabric.

The latex used in the operations described herein should be thick enough so that it will retain the pin impressions as spread, or else sufficiently stable so that it will dry to this thickness without coagulating and in either case must be spread smoothly without striking through the textile fabric. A latex having the following ingredients has been found suitable.

| | Parts by weight |
|---|---|
| Rubber in creamed latex | 100.0 |
| Water in creamed latex | 53.8 |
| Casein thickener (solubilized in aqueous alkali, casein 1.5 parts) | 4.5 |
| Sodium hydroxide | .5 |
| Aqueous colloidal sulphur paste (sulphur 1 part) | 1.7 |
| Aqueous colloidal zinc oxide paste (ZnO 1 part) | 2.5 |
| Aqueous non-discoloring antioxidant paste (antioxidant 1 part) | 2.5 |
| Aqueous ultra rapid accelerator paste (Accelerator 1 part) | 2.3 |
| Total solids, 64%. | |

The above formula is given for an example and it is not intended that the invention be limited thereby because other latices may be used.

While several forms of this invention have been described in detail, it will be understood that further modifications may be made without departing from the spirit of the invention and the scope of the appended claims.

Having thus described our invention, what we claim and desire to protect by Letters Patent is:

1. The method of making a perforate latex rubber film comprising the steps of applying a substantially uncoagulated coating of latex to a deposition backing; forming openings in the coating by extending pins into and removing them from the coating, said pins being removed from said coating before it has been coagulated sufficiently to render it tough and elastic, and while it is in a sufficiently viscous condition that the walls of the depressions formed by the pins will not flow together as a result of the forces of gravity and surface tension acting thereon; and treating the coating to convert it into an elastic film.

2. The method of making a perforate latex rubber film comprising the steps of applying a substantially uncoagulated coating of latex to a deposition backing; forming openings in the coating by extending pins into and removing them from the coating, said pins being removed from said coating before it has been coagulated sufficiently to render it tough and elastic, and while it is in a sufficiently viscous condition that the walls of the depressions formed by the pins will not flow together as a result of the forces of gravity and surface tension acting thereon; at least partially vulcanizing the coating; and removing the coating from the deposition backing.

3. The method of making a latex rubber film comprising the steps of progressively applying a substantially uncoagulated coating of latex to a moving deposition backing; forming openings in the coating by extending the ends of pins projecting from a rotating cylinder into and out of the coating while the surface of the cylinder is maintained out of contact with the coating and while the coating is in a substantially uncoagulated condition and in a sufficiently viscous condition that the walls of the depressions formed by the pins will not flow together as a result of the forces of gravity and surface tension acting thereon; and treating the coating to convert it into an elastic film.

4. The method of making a perforate latex rubber film comprising the steps of applying a substantially uncoagulated coating of latex to a deposition backing; extending the blunt ends of pins into the coating and pressing the ends firmly against the backing; removing the pins from the coating before the latex coagulates under the pins sufficiently to render it tough and elastic and while the coating is in a sufficiently viscous condition that the walls of the depressions formed by the pins will not flow together as a result of forces of gravity and surface tension acting thereon; and treating the coating to convert it into an elastic film.

5. The method of making a perforate latex rubber film comprising the steps of applying a substantially uncoagulated coating of latex to a deposition backing; extending the blunt ends of pins projecting from a support into the coating and pressing the ends firmly against the backing while maintaining a free space between the top surface of the coating and the pin support; removing the pins from the coating before the latex coagulates under the pins sufficiently to render it tough and elastic and while the coating is in a sufficiently viscous condition that the walls of the depressions formed by the pins will not flow together as a result of forces of gravity and surface tension acting thereon; and treating the coating to convert it into an elastic film.

6. The method of making perforate latex rubber films comprising the steps of applying a coating of substantially uncoagulated latex to a stretched elastic surface, forming openings in the coating by extending pins into said coating, removing said pins from said coating before it has substantially coagulated and while the coating possesses such viscosity that the openings formed therein by the pins remain therein at ordinary conditions of pressure after the pins are removed, releasing at least some of the tension on said stretched surface and thereby contracting said coating, treating said coating to convert it into an elastic rubber film, and removing said film from said surface.

7. The method of making a porous laminated textile and latex rubber fabric comprising the steps of forming openings in a coating of latex by extending the ends of pins into the coating and removing them therefrom before the latex has substantially coagulated, the pins being removed from the coating while it possesses such a viscosity that the openings formed by the pins remain therein after the pins have been removed; and treating said film after it has been combined with a layer of textile fabric to render the rubber film elastic.

8. The method of making a porous laminated textile and latex rubber fabric comprising the steps of applying a coating of substantially uncoagulated latex to a surface, forming openings in the coating by extending pins into it while the rubber particles contained therein are in the dispersed phase, removing said pins from said coating while the rubber particles are in the dispersed phase and while the coating possesses such a viscosity that the openings produced by said pins remain in said coating after the pins are removed, then applying a textile fabric to said coating, coagulating said latex coating and removing said textile fabric with the rubber coating adhered thereto from said surface.

9. The method of making a porous laminated textile and latex rubber fabric comprising the steps of applying a coating of substantially uncoagulated latex to a textile fabric, forming openings in the coating by extending pins into the coating, removing said pins from said coating before the coating has substantially coagulated and while the coating possesses such a viscosity that the openings produced by said pins remain in said coating after the pins are removed, and treating said coating to produce an elastic perforate film of rubber bonded to said fabric.

10. The method of making a porous laminated textile and latex rubber fabric comprising the steps of applying a coating of substantially uncoagulated latex to a textile fabric, forming openings in said coating by extending the blunt ends of a plurality of spaced pins into said coating and firmly against the textile fabric but not through same, removing said pins from said coating before the latex under the ends of the pin has substantially coagulated and while the coating is in such a viscous condition that the walls of the depressions made by the pins will not flow together by virtue of forces of gravity and surface tension acting on said coating, and treating said coating so as to convert it into an elastic film of latex rubber.

11. The method of making an elastic porous laminated textile and latex tube fabric comprising the steps of applying a coating of latex to the surface of the textile fabric, forming openings in the coating by extending a plurality of spaced pins into and removing them from said coating while it is in a plastic, non-elastic and somewhat dispersed condition and its viscosity is such that the walls of the depressions made in the coating by the pins will not flow together due to forces of gravity and surface tension acting thereon after the pins are removed, stretching an elastic surface, drying the coating to a tacky coagulated condition, adhesively uniting the coated side of said textile fabric to such stretched surface, releasing at least some of the tension on said surface to thereby super-relax said fabric and condense the coating therewith, and removing said textile fabric with the film adhered thereto from said elastic surface.

12. The method of making an elastic porous laminated textile and latex rubber fabric comprising the steps of applying a coating of substantially uncoagulated latex to the surface of the textile fabric, forming openings in the coating by extending the blunt ends of pins into the coating and firmly against the textile fabric but not through same, removing said pins from said coating before the latex has been coagulated to a tough elastic condition and while it possesses such a viscosity that the openings formed by the pins remain in said coating after their removal, drying the coating to tacky condition, stretching an elastic surface, adhering the coated side of said textile fabric to said stretched surface, releasing at least some of the tension on said surface to thereby super-relax said fabric and condense the coating therewith, and removing said textile fabric with the film adhered thereto from said elastic surface.

13. The method of making an elastic porous laminated textile and latex rubber fabric comprising the steps of applying a coating of substantially uncoagulated latex to the surface of the textile fabric, forming openings in said coating by extending the blunt ends of a plurality of spaced pins into said coating and firmly against the fabric but not through same, removing said pins from said coating before it has substantially coagulated and while it is in such a viscous condition that the walls of the depressions made by the pins will not flow together by virtue of forces of gravity and surface tension acting thereon, stretching an elastic surface, drying the latex to a tacky condition, adhering the coated side of said textile fabric to such stretched surface while the latex coating is in the tacky condition, releasing at least some of the tension on said surface to thereby super-relax said fabric and condense the coating therewith, at least partially vulcanizing the latex coating so as to convert it into an elastic film of latex rubber, and removing said textile fabric with the film adhered thereto from said elastic surface.

14. The method of making a porous laminated elastic textile and latex rubber fabric comprising the steps of applying a coating of latex to a stretched elastic surface, extending pins through said coating and removing said pins while the latex particles contained in the coating are in the dispersed phase and while the coating possesses such a viscosity that the openings produced by said pins remain in said coating after the pins are removed, adhering a textile fabric to said perforated coating, and releasing sufficient tension on said surface to super-relax said fabric and contract the coating therewith, treating said latex coating to convert it into an elastic film of latex rubber, and removing said textile fabric with the film adhered thereto from the elastic surface.

15. The method of making perforate latex rubber films comprising the steps of applying a coating of latex to a stretched elastic surface, extending pins through said coating while the coating is in a plastic and substantially non-elastic condition, removing said pins from said coating while the coating possesses such viscosity that the openings produced thereby in said coating remain therein at ordinary conditions of pressure after the pins are removed, releasing at least some of the tension on said stretched surface and thereby contracting said coating, treating said coating to convert it into an elastic rubber film, and removing said film from said surface.

MERWYN C. TEAGUE.
PAUL L. MAHONEY.